United States Patent Office 3,660,358
Patented May 2, 1972

3,660,358
PROCESS FOR PRODUCING POLYESTERS AND SHAPED ARTICLES RESPECTIVELY MADE FROM THESE POLYESTERS
Josef Hrach and Theodor Wimmer, Tyrol, Austria, assignors to Sandoz Ltd., Basel, Switzerland
No Drawing. Filed Nov. 12, 1968, Ser. No. 775,176
Claims priority, application Austria, Nov. 21, 1967, 10,487/67; Dec. 1, 1967, 10,865/67
Int. Cl. C08f 17/013
U.S. Cl. 260—75 R                    6 Claims

ABSTRACT OF THE DISCLOSURE

Polyesters of dicarboxylic acids and diols, more particularly, polyethylene terephthalate, are prepared by reacting the selected starting materials in the presence of a metallic catalyst consisting of (a) antimony, (b) at least one member selected from the group consisting of lead and tin, and (c) an alkali metal in amounts of from 0.005 to 1% by weight based upon the amount of carboxylic acids in the process. These polyesters are particularly suitable for the production of shaped articles including fibers, filaments and films.

---

This invention relates to a process for producing polyesters which exhibit improved properties owing to the use of new catalysts; the invention also relates to the polyesters thus obtained and to their use of producing shaped bodies. In the following description copolyesters are also meant by the expression polyesters.

The method of producing polyesters from one or more aromatic and/or aliphatic dicarboxylic acids or their functional polyester-forming derivatives and aliphatic and/or cyclic dioles is known. In the polyesters of greatest technical importance the major proportion of the acid component is terephthalic acid. The other acids employed include iso-phthalic, 5-sulfo-isophthalic, diphenyldicarboxylic, diphenylsulphonedicarboxylic, 2,6-naphthalenedicarboxylic, adipic and sebacic acid. Ethylene glycol is the most commonly used diole component; others are 1,4-butanediole, 1,4-bis[hydroxymethyl]-cyclohexane and 2,2-bis-[4'-β-hydroxyethoxyphenyl]-propane, also referred to as bis-phenol-A-diglycolether. Small amounts of compounds forming cross linkages may be condensed with the polyester, for example trivalent or multivalent carboxylic acids, alcohols or phenols, unsaturated aliphatic dicarboxylic acids, or 2,5-dihydroxyterephthalic acid. Products of this type and a process for their production are described, for example, in British Pat. 578,079, U.S. Pat. 2,901,466, French Pat. 1,438,863, and the German Auslegeschrift 1,052,683. The general practice is to re-esterify the dimethylester of the dicarboxylic acid with the glycol in the first stage of the process and to polycondense the resulting diglycol ester in the second stage to yield the polyester. Direct esterification of the free dicarboxylic acids with the glycol is also possible whereupon the diglycolester thus obtained is submitted to polycondensation. In the following description the term esterification is intended to comprise re-esterification, direct esterification and polycondensation.

Catalysts are added to the reaction mixture to accelerate esterification. Metals, metal alloys and metal compounds have been suggested for this purpose, among many others also antimony, tin, lead and alkaline earth metals, compounds of these metals and alloys of antimony/tin and tin/lead. Many of the common catalysts are not sufficiently effective while others are highly effective but yield discolored polyesters or polyesters showing insufficient color and heat stability. Consequently phosphorus compounds or other stabilizing agents have to be added to the reaction mixture. These additions however have a detrimental effect on other properties of the polyesters e.g. their mechanical and electrical properties, and usually cause a prolongation of the reaction time.

It has been found that catalysts containing (a) antimony, (b) tin and/or lead and (c) one or more alkaline metals have highly effective catalytic action while their adverse effect on the properties of the final polyester is very slight indeed. The catalyst components antimony, lead and tin primarily accelerate the polycondensate reaction while the alkaline metals preferably enhance the re-esterification reaction.

The catalysts may contain the above mentioned metals in form of a mixture. Alloys of two or more metals may be employed as well. Finally the compounds of these metals may be used instead of one or more of the metals, especially compounds being soluble in a monovalent or polyvalent alcohol. An alloy of particular interest is one of e.g. antimony and lead and especially useful metal compounds are the oxides, hydroxides, salts or complex compounds, such as antimony glycolate, lead oxide, lead acetate, tin acetate, alcoholates of alkaline metals and the alkaline metal salts of fumaric, acetic or other monocarboxylic acids. The metals or alloys may be employed in the form of a fine powder and as a suspension e.g. in methanol or ethylene glycol as well as in the form of chips, granules or cut wire. It is of particular advantage to use solutions e.g. solutions in a monovalent or divalent alcohol being employed as reaction component or being present during the reaction, e.g. ethylene glycol or methanol, or in a monocarboxylic acid like acetic acid.

The new catalysts generally are employed in amounts of approximately 0.005 to 1% by weight or more particularly 0.01 to 0.5% by weight, in relation to the total amount of dicarboxylic acids or of their functional acid derivatives. The catalysts generally contain 10 to 80, preferably 10 to 50, especially 15 to 35 parts by weight of antimony, 10 to 80, preferably 10 to 60, especially 15 to 35 parts by weight of lead and/or tin and 5 to 70, preferably 5 to 50, especially 10 to 30 parts by weight of one or more alkaline metals.

The new catalysts are particularly important for producing linear polyesters being eventually ramified or cross-linked to a small extent and being prepared of aromatic dicarboxylic acids particularly those containing more than 85 mol percent terephthalic acid and of polymethyleneglycols corresponding to the formula $HO-(CH_2)_n-OH$, wherein $n$ is a whole number of 2 to 10, or of 1,4-bis-[hydroxymethyl]-cyclohexane. They are of greatest importance for the production of polyethyleneterephthalate. In dependance of the alkaline metal being used as catalyst component the polyesters obtained may be used either for producing fibres or filaments by spinning the polyester melt or for producing injection molded or extruded articles. Thus using antimony, tin or lead and potassium products are obtained showing a relatively high crystallization temperature (i.e. the temperature of the maximum crystallization rate), crystalize rather slowly and tending to form coarse-crystalline, mostly spherulitic crystalline structure. If however antimony, tin and/or lead and lithium or sodium are used as catalysts the obtained products show a low crystallization temperature, crystalize more rapidly and have a finely crystalline and uniform structure. Thus catalysts consisting of antimony, tin and/or lead and potassium are particularly useful for producing polyesters for fibres, filaments and films and catalysts consisting of antimony, tin and/or lead and sodium or lithium are particularly useful for producing polyesters for injection molded and extruded articles.

The polyesters may be produced, for example, by heating a mixture of terephthalic acid dimethylester, ethylene glycol and 0.05% by weight of one of the new catalysts under nitrogen and with stirring. In the first stage of the reaction, the re-esterification stage, methanol and ethylene glycol distill off at temperatures up to about 250° C. under normal pressure. In the second stage of the reaction, polycondensation takes place at temperatures of approximately 240° to 300° C. or preferably 265° to 280° C. under reduced pressure. The reaction times depend on the desired molecular weight and on the intrinsic viscosities of the polyesters to be produced. For producing fibres or filaments in clothing, home textile or web industry, for example, polyesters having intrinsic viscosities of up to 0.70 generally will be sufficient whereas for the manufacture of technical textiles like tire cord or of injection molded or extruded articles polyesters having intrinsic viscosities above 0.70, particularly above 0.80 will be used.

The resulting polyester melt is driven out of the polycondensation vessel and is granulated or cut into chips in the usual manner. The further processing of the material which preferably is dried to a moisture content of less than 0.02% by weight of the dried material also follows the known techniques.

Instead of the terephthalic acid dimethylester other esters of terephthalic acid with monovalent alcohols having 2–4 carbon atoms may be employed.

The polyesters obtained by using the new catalysts may be shaped in mixture with each other or with conventional polyesters. Furthermore any known additives like dyes, pigments, fillers, delusterants or strengthening agents may be added to the polyesters.

It is known to produce fibres, filaments and films as well as injection molded and extruded articles out of polyesters of terephthalic acid. By using the new catalysts, however, polyesters are obtained that show particularly valuable properties, above all they have a light color, excellent color and heat stability and a low content of ether groups and carboxy groups. They yield colorless, almost non discoloring and very heat resistant fibres, filaments and films. The shaped goods obtained by injection molding or extrusion show excellent mechanical properties due to their uniform finely crystalline structure. This is particularly valid if the mold temperature, when working the polyester, is approximately 20 to 70° C. above the freezing temperature. The mold temperature therefore is preferably adjusted to the temperature of the maximum crystallization rate or a little above this temperature, i.e. approximately 125° to 150° C. (British Pat. 609,795). For achieving a particularly finely and uniformly crystalline structure in the shaped bodies other methods have been suggested already, e.g. the addition of polyolefins or of crystallization nuclei. It is essential to obtain a very fine and homogenous distribution of the additive in the polyester which may be effected best by melting in an extruder and subsequently driving out, cooling and granulating the polyester. This additional process step is not only onerous and price lifting but also causes a certain thermic and hydrolytic degradation as well as a color deterioration of the polymer.

In the following examples the parts and percentages are by weight and the temperatures in degree centigrade. The intrinsic viscosity values were determined with solutions of 0.5 gram of the polyester in 100 milliliters of a mixture of equal parts of phenol and tetrachlorethane. Crystallization rate, crystallization temperature (temperature of the maximum crystallization rates) and melting points were determined at tempered and chilled samples by using the Differential Scanning Calorimeter DSC–1 of Perkin-Elmer.

When the polyesters obtained in accordance with the procedure of Examples 1, 3, 4, 5, 6, 11, 12 and 13 are granulated, dried to a moisture content of less than 0.02%, preferably less than 0.01% and shaped to drinking-cups by use of an injection-molding machine the cups are easily deformable and are completely and homogenously crystallize (density about 1.38). They show inherent stability and do not shrink even when heated in air of 140° C. for half an hour. The mechanical properties are excellent.

The polyester obtained in accordance with Examples 2, 7, 10 and 14 are dried to a moisture content of preferably less than 0.01% and may be worked to form cold drawable filaments and foils with excellent mechanical properties.

Whenever the catalysts are employed in form of a powdered alloy the grain size may go up to 200$\mu$.

EXAMPLE 1

A mixture of 5000 parts of terephthalic acid dimethylester and 3990 parts of ethylene glycol is heated with stirring in the absence of atmospheric oxygen and moisture and in the presence of 0.25 part of a pulverized alloy of 60% antimony and 40% lead being sieved to yield an average grain size of about 25$\mu$ and 0.25 part of lithium in the form of a solution of the metal in ethylene glycol.

Methanol and ethylene glycol distill off at temperatures of up to 250° C. within 4 hours. Stirring is continued for 5 hours at 265–270° C. and 0.5 torr.

The polyethyleneterephthalate thus obtained melts at 259° and has an intrinsic viscosity of 0.70.

Freezing temperature and crystallization temperature are at 71° and 129° respectively. The polymer material is granulated, dried to a moisture content of less than 0.02% and is formed to drinking cups by use of a conventional injection molding machine, a mold temperature of 130° being maintained. The cups are easily deformable and completely homogenously crystallized (density 1.380). They show very good inherent stability. No shrinking was observed even after heating them for half an hour in air of 140°.

EXAMPLE 2

A mixture of 3880 parts of terephthalic acid dimethylester and 3100 parts of glycol is heated with stirring in the absence of atmospheric oxygen and in the presence of 1.52 parts of a pulverized alloy of 80% antimony and 20% lead and 0.38 part of potassium as a solution in tert.-butanol at temperatures of up to 250°. Methanol and ethylene glycol distill off within 4 hours. Stirring is continued for 5½ hours at a temperature of 265° under a vacuum of 0.45–0.50 torr. A polyethyleneterephthalate is obtained having an intrinsic viscosity of 0.90 and a melting temperature of 265°. The polycondensate has a freezing temperature of 71° and a crystallization temperature of 150°.

The polymer material is granulated, dried to a moisture content of 0.01% and the polyester melt is spun to fibres showing excellent technical properties.

EXAMPLE 3

A mixture of 3880 parts terephthalic acid dimethylester, 3100 parts of ethylene glycol is heated in the presence of 1.52 parts of a pulverized alloy of 50% antimony and 50% lead with an average grain size of about 45$\mu$ and 0.38 part of sodium in the form of a solution of the metal in ethylene glycol and in the absence of atmospheric oxygen. Methanol and ethylene glycol distill off at temperatures up to 250° C. within 4 hours.

Stirring is continued for 5½ hours at 270° and a vacuum of 0.3–0.4 torr. A colorless polyester is obtained having an intrinsic viscosity of 0.90 and melting at 256°. The freezing temperature is 76°, the crystallization temperature 137°. The polyethyleneterephthalate thus obtained is granulated, dried to a water content of 0.01% and formed to drinking cups by use of a conventional injection molding machine (mold temperature 130°).

The cups are completely homogenously crystalize (density 1.38), they are easily deformable and show excellent mechanical properties.

EXAMPLE 4

A mixture of 3880 parts of terephthalic acid dimethylester, 3100 parts of ethylene glycol, 1.52 parts of an alloy of 60% antimony and 40% tin and 0.38 part of lithium as a solution in ethylene glycol is submitted to the procedure of Examples 1, 2 and 3 for the reesterification and polycondensation. A colorless polyethyleneterephthalate is obtained having an intrinsic viscosity of 0.91 and melting at 257°.

Freezing temperature and crystallization temperature are at 73° and 131° respectively. The polycondensate may be worked according to the procedure of Examples 1 and 3 to yield drinking cups having excellent mechanical properttes.

EXAMPLE 5

The catalyst of Example 4 is replaced by 1.90 parts of an alloy of 60% antimony and 40% tin being sieved to yield an average grain size of appr. 25μ and 1.14 parts sodium as a solution in ethylene glycol, the amounts of terephthalic acid dimethylester and ethylene glycol remaining the same, and the reaction mixture is treated according to the proceeding given in Examples 1 to 4. A colorless polyethyleneterephthalate is obtained having an intrinsic viscosity of 0.88 and a melting point of 259°.

Freezing temperature and crystallization temperature are 75° and 132° resp. The polycondensate thus obtained is granulated, dried to a moisture content of less than 0.02% and worked on a conventional injection molding machine (mold temperature 130°) to yield drinking cups having excellent mechanical properties.

EXAMPLE 6

A mixture of 3880 parts of terephthalic acid dimethylester, 3100 parts of glycol and 2.72 parts of pentaerythritol (0.1 mol percent in relation to terephthalic acid dimethylester) is heated to 250° with stirring in the absence of atmospheric oxygen and in the presence of 1.52 parts of a pulverized alloy of 60% antimony and 40% lead and 0.38 part of lithium in the form of a solution of the metal in ethylene glycol. Methanol and ethylene glycol distill off within 4 hours. Stirring is continued for 5½ hours at 270–275° C. and a vacuum of 0.45 to 0.50 torr. The colorless polyester thus obtained has an intrinsic viscosity of 0.93 and melts at 258°. Freezing temperature and crystallization temperature are 71° and 131° respectively.

The slightly cross-linked polycondensate is excellently apt for producing injection molded articles in accordance with the procedure as detailed in Examples 1, 3, 4 and 5.

EXAMPLE 7

A mixture of 3880 parts of terepthalic acid dimethylester, 3100 parts of ethylene glycol, 2.72 parts of pentaerythritol (0.1 mole percent in relation to the terephthalic acid dimethylester) and 632 parts (10 mol percent in relation to the terephthalic acid dimethylester) of bis-phenol-A-diglycolether is reesterified and polycondensed according to the procedure as detailed in Examples 1 to 6 in the presence of 1.52 parts of an alloy of 70% antimony and 30% tin, and 0.38 part of potassium as a solution in tert.-butanol.

The colorless copolyester thus obtained has an intrinsic viscosity of 0.96 and a melting point of 235°. The freezing temperature is 71°, the crystallization temperature is 154°. The polyethyleneterephthalate is excellently apt for being spun from the melt to yield fibres according to the procedure detailed in Example 2. The fibres have excellent technical properties.

EXAMPLE 8

A mixture of 5000 parts of terephhtalic acid dimethylester and 3990 parts of ethylene glycol is heated with stirring in the absence of atmospheric oxygen and in the presence of 1.79 parts of antimony trioxide, 0.78 part of lead acetate and 4.7 parts of lithium acetate.

Methanol and ethylene glycol distill off at temperatures up to 250° C. within 4 hours. Stirring is continued for 6 hours a 270° under a vacuum of 0.4–0.5 torr. The colorless polyester thus obtained has an intrinsic viscosity of 0.92 and a melting point of 255°. The freezing temperature and the crystallization temperature are at 72° and 137° respectively.

EXAMPLE 9

The catalyst combination of Example 8 is replaced by 2.6 parts of antimony glycolate, 0.54 part of lead oxide and 2.68 parts of sodium acetate, the amount of terephthalic acid dimethylester and ethylene glycol and the whole procedure remaining the same. A colorless polyethyleneterephthalate is obtained having an intrinsic viscosity of 0.89 and a melting point of 255°. The freezing temperature and the crystallization temperature are at 73° and 137° respectively.

EXAMPLE 10

A mixture of 5000 parts of terephthalic acid dimethylester and 3990 parts of glycol is heated with stirring in the presence of 2.39 parts of antimony trioxide, 0.56 part of tin oxide and 0.38 part of potassium as solution in tert.-butanol and in the absence of atmospheric oxygen.

Methanol and ethylene glycol distill off at temperatures up to 250° C. within 4 hours. Stirring is continued for 5½ hours at 270° and under a vacuum of 0.4–0.5 torr.

The colorless polyester thus obtained has an intrinsic viscosity of 0.86 and a melting point of 261°. The freezing temperature and the crystallization temperature are at 72° and 156° resp.

The polycondensate may be spun according to the procedure given in Examples 2 and 7 to yield fibres with excellent technical properties.

EXAMPLE 11

A mixture of 3000 parts of terephthalic acid dimethylester and 2400 parts of ethylene glycol is heated with stirring in the absence of atmospheric oxygen and in the presence of 2.1 parts of a pulverized alloy of 70% antimony and 30% lead having an average grain size of about 45μ and 0.3 parts of sodium as a solution in ethylene glycol. Methanol and ethylene glycol distill off at temperatures up to 250° C. within 4 hours. Stirring is continued at about 275° and 0.4 to 0.5 torr. The polyester thus obtained has an intrinsic viscosity of 0.83 and melts at 255°.

The freezing temperature and the crystallization temperature are at 77° and 136° respectively. The polycondensate is excellently apt for being worked to yield injection molded articles in accordance with the procedure as detailed in Examples 1, 3, 4 and 6.

EXAMPLE 12

The catalyst combination of Example 11 is replaced by 2.1 parts of a pulverized alloy of 70% antimony and 30% lead having an average grain size of approximately 45μ and 0.3 part of lithium as a solution in ethylene glycol, the amounts of terephthalic acid dimethylester and ethylene glycol and the procedure remaining the same. A polyethylene terepthalate is obtained having an intrinsic viscosity of 0.86 and a melting point of 256°. The freezing temperature is 77° and the cristillization temperature is 139°. The polycondensate is very well apt for being shaped to injection molded articles in accordance with the procedure of Examples 1, 3, 4, 5, 6 and 11.

EXAMPLE 13

A mixture of 5000 parts of terephthalic acid dimethylester and 3990 parts of ethylene glycol is heated with stirring in the presence of 2.5 parts of a pulverized alloy of 80% antimony and 20% lead having a medium grain size of appr. 45μ and 1 part of lithium as a solution in ethylene glycol and in the absence of atmospheric oxygen. Methanol and ethylene glycol distill off at a temperature up to 250° C. within 4 hours. Stirring is continued for 6 hours at 275° and 0.4–0.5 torr. The colorless polyethyleneterephthalate thus obtained has an intrinsic viscosity of 0.92 and a melting point of 257°. The freezing temperature and the crystallization temperature are at 73° and 131° respectively. The polyester is excellently apt for producing shaped articles by injection molding.

EXAMPLE 14

A mixture of 5000 parts of terephthalic acid dimethylester and 3990 parts of ethylene glycol is heated with stirring in the absence of atmospheric oxygen and in the presence of 2.5 parts of an alloy of 80% antimony and 20% lead having a medium grain size of appr. 45μ and 0.5 part of potassium in the form of a solution of the metal in tert.-butanol. Methanol and ethylene glycol distill off at temperatures up to 250° C. within 4 hours. Stirring is continued for 5½ hours at a temperature of about 275° and under a vacuum of 0.4–0.5 torr. The colorless polyethyleneterephthalate thus obtained has an intrinsic viscosity of 0.87 and a melting point of 257° C. The freezing temperature and the crystallization temperature are at 73° and 131° respectively. The polymer material thus obtained is excellently apt for being spun to fibres from the polyester melt.

What is claimed is:

1. A process for producing moldable polyesters and copolyesters comprising heating at least one lower alkyl ester of a dicarboxylic acid selected from the group consisting of terephthalic, isophthalic, 5-sulfo-isophthalic, diphenyldicarboxylic, diphenylsulphonedicarboxylic, 2,6-naphthalinedicarboxylic, adipic and sebacic acid with at least one diol selected from the group consisting of ethylene glycol, 1,4-butanediol, 1,4-bis[hydroxymethyl]-cyclohexane and 2,2-bis-[4'-β-hydroxyethoxyphenyl]-propane in the presence of a tricomponent metal-containing catalyst suitable for catalyzing an ester interchange and polycondensation reaction, said catalyst being selected from the group consisting of (a) 10–80% by weight of antimony, (b) 10–80% by weight of lead and (c) 5–70% by weight of an alklai metal and (a') 10–80% by weight of antimony, (b') 10–80% by weight of tin and (c') 5–70% by weight of an alklali metal, said catalyst being present in an amount of 0.005 to 1% by weight based on the total amount of lower alkyl ester employed in the process.

2. A process according to claim 1 in which the lower alkyl ester is the dimethyl ester.

3. A process according to claim 1 wherein said alkali metal is added to the heated lower alkyl dicarboxylic acid ester and diol in the form of a monovalent alcohol solution.

4. A process according to claim 1 wherein the tricomponent metal-containing catalyst is selected from the group consisting of (a) 10–50% by weight of antimony, (b) 10–60% by weight of lead, and (c) 5–50% by weight of alkali metal and (a') 10–50% by weight of antimony, (b') 10–60% by weight of tin and (c') 5–50% by weight of alkali metal.

5. A process according to claim 1 wherein the tricomponent metal-containing catalyst is selected from the group consisting of (a) 15–35% by weight of antimony, (b) 15–35% by weight of lead and (c) 10–30% by weight of alkali metal and (a') 15–35% by weight of antimony, (b') 15–35% by weight of tin and (c') 10–30% by weight of alkali metal.

6. A process according to claim 1 wherein the catalyst is present in an amount of from 0.01 to 0.5% by weight, based on the total amount of lower alkyl ester employed in the process.

References Cited

UNITED STATES PATENTS

| 2,465,319 | 3/1949 | Whinfield et al. | 260—75 |
|---|---|---|---|
| 3,053,810 | 9/1962 | Griehl et al. | 260—75 |
| 3,055,867 | 9/1962 | Le Bras et al. | 260—75 |
| 3,079,368 | 2/1963 | Lundberg | 260—75 |
| 2,503,251 | 4/1950 | Edwards et al. | 260—75 UX |
| 2,744,129 | 5/1956 | Caldwell | 260—75 S |
| 2,823,421 | 2/1958 | Scarlett | 264—216 |
| 3,110,547 | 11/1963 | Emmert | 260—75 |
| 2,597,643 | 5/1952 | Izard et al. | 260—75 |

FOREIGN PATENTS

| 610,137 | 10/1948 | Great Britain | 260—75 |
|---|---|---|---|
| 740,381 | 11/1955 | Great Britain | 260—75 |
| 1,297,516 | 5/1962 | France | 260—75 |

MELVIN GOLDSTEIN, Primary Examiner

U.S. Cl. X.R.

260—475 P